(12) United States Patent
Dettinger et al.

(10) Patent No.: US 7,085,757 B2
(45) Date of Patent: Aug. 1, 2006

(54) ABSTRACT DATA LINKING AND JOINING INTERFACE

(75) Inventors: Richard D. Dettinger, Rochester, MN (US); Cale T. Rath, Byron, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 10/618,409

(22) Filed: Jul. 11, 2003

(65) Prior Publication Data

US 2005/0010557 A1    Jan. 13, 2005

(51) Int. Cl.
G06F 17/00    (2006.01)
G06F 7/00    (2006.01)

(52) U.S. Cl. .................. 707/3; 707/104.1; 715/968; 715/780; 715/853; 715/854

(58) Field of Classification Search .................. 707/3, 707/104.1, 4, 104; 715/853, 854, 780, 968
See application file for complete search history.

(56) References Cited

U.S. PATENT DOCUMENTS

| | | | |
|---|---|---|---|
| 5,812,840 A * | 9/1998 | Shwartz | 707/4 |
| 5,844,554 A * | 12/1998 | Geller et al. | 715/744 |
| 5,963,938 A * | 10/1999 | Wilson et al. | 707/4 |
| 6,161,103 A | 12/2000 | Rauer et al. | |
| 6,289,334 B1 * | 9/2001 | Reiner et al. | 707/3 |
| 6,408,308 B1 * | 6/2002 | Maslyn et al. | 707/104.1 |
| 6,490,581 B1 * | 12/2002 | Neshatfar et al. | 707/4 |
| 6,640,221 B1 * | 10/2003 | Levine et al. | 707/3 |
| 6,658,429 B1 * | 12/2003 | Dorsett, Jr. | 707/1 |
| 6,694,306 B1 * | 2/2004 | Nishizawa et al. | 707/3 |
| 6,725,227 B1 | 4/2004 | Li | |

OTHER PUBLICATIONS

Dettinger et al., IBM U.S. Appl. No. 10/131,984 (ROC920020089US1), filed Apr. 25, 2002, "Remote Data Access and Integration of Distributed Data Sources Through Data Schema and Query Abstraction".

* cited by examiner

*Primary Examiner*—Safet Metjahic
*Assistant Examiner*—Thanh-Ha Dang
(74) *Attorney, Agent, or Firm*—Patterson & Sheridan, LLP; William J. McGinnis, Jr.

(57) ABSTRACT

A method, apparatus and article of manufacture provide a user interface allowing user selection and arrangement of result fields selected, in one embodiment, from a logical model. In one embodiment, the user interface is a graphical user interface and comprises input cells for user-selected logical result fields. The cells are arranged to define a geometric relationship between logical result fields which dictates the combinatorial statement type by which the logical result fields in the cells are related in a query.

13 Claims, 16 Drawing Sheets

ABSTRACT DATA LINKING AND JOINING INTERFACE

CROSS-RELATED APPLICATIONS

One approach for accessing a multiplicity of data sources is described in more detail in U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

BACKGROUND OF THE INVENTION

1. Field of the Invention

The present invention generally relates to data processing, and more particularly, to the accessing data through a logical framework.

2. Description of the Related Art

Databases are computerized information storage and retrieval systems. The most prevalent type of database is the relational database, a tabular database in which data is defined so that it can be reorganized and accessed in a number of different ways. A relational database management system (DBMS) is a database management system that uses relational techniques for storing and retrieving data.

Regardless of the particular architecture, in a DBMS, a requesting entity (e.g., en application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM®) DB2®, Microsoft's® SQL Server, and database products from Oracle®, Sybase®, and Computer Associates®. The term "query" denominates a set of commands for retrieving data from a stored database. More generally, queries take the form of a command language that lets programmers and programs select, insert, update, find out the location of data, and so forth.

Often, a query may need to be run against multiple tables to return the desired data. This is the case, for example, when data resides in more than one database (i.e., located on more than one database server). For example, a patient's records (diagnosis, treatment, etc.) may be stored in one database, while clinical trial information relating to a drug used to treat the patient may be stored in another database. Therefore, to access the data, a federated query may be generated that targets each of these distinct databases. As used herein, the term federated query generally refers to any query that requires combining results of queries run against distinct databases. The operation by which this is accomplished is referred to herein as a combinatorial statement. By way of example, combinatorial statements include such statements as the family of JOIN statements (including INNER, OUTER, LEFT and RIGHT), the family of UNION statements. The JOIN pairs up data from two different tables or from the same table. UNION can operate on two identical tables or be used to concatenate data from similar fields of interest. For example, a field named ADDRESS can be UNIONED with a field named LOCATION. These fields are not identical and may be or may not be from the same table, but they contain similar information. By way of illustration, Tables I and II shows an example of SQL statements in which tables are JOINed and UNIONed respectively.

TABLE I

SELECT T1.ADDRESS, T1.CITY, T1.STATE, T1.ZIP, T2.LOCATION FROM ADDRESSES T1, NEIGHBORHOOD T2 WHERE T1.ADDRESSID = T2.ADDRESSID AND T1.ZIP = 55901

TABLE II

SELECT ADDRESS, CITY, STATE, ZIP FROM ADDRESSES WHERE ZIP = 55901
UNION
SELECT LOCATION, NULL, NULL, NULL FROM NEIGHBORHOOD WHERE ZIP = 55901

The UNION example (Table II) appends location after ADDRESS, and the JOIN (Table I) example links the location with the address that it belongs to.

It is noted that JOINS and UNIONS are but two examples of combinatorial statements. Another example of a combinatorial statement is the family of EXCEPT statements. Further, corresponding statements exist or may be yet be developed for query languages other than SQL (e.g., XQuery).

Conventionally, users are required to create query statements with an understanding of the underlying physical data in order to apply the proper combinatorial statements in a manner that returns the desired results. However, this places a significant burden on the user and limits access to users having sufficient expertise.

Therefore, what is needed is a query building interface providing flexibility, in particular, where data may need to be linked or combined to return the desired results.

SUMMARY OF THE INVENTION

The present invention provides a method, system and article of manufacture for accessing abstractly described physical data using combinatorial statements such as JOINs and UNIONs. In one embodiment, data is defined by an abstraction model which includes metadata describing and defining a plurality of logical fields. A user interface tool is provided for creating abstract queries. One aspect of the tool provides users a means of mapping those fields (columns) which must be combined by a first statement type (e.g., UNION) and those fields that must be combined by a second statement type (e.g., JOIN).

In one embodiment a method provides a logical representation of physical fields of physical data entities to facilitate querying the physical fields. The method comprises providing a logical model to logically describe the physical fields, the logical model comprising logical fields corresponding to respective physical fields; and providing a runtime component configured to transform an abstract query into an executable query containing at least one combinatorial statement, the abstract query comprising a condition and at least two result fields selected from the logical fields of the logical model, each result field having executable counterparts in the at least one combinatorial statement of the executable query.

Another method provides a logical representation of physical fields of physical data entities to facilitate querying the physical fields. The method comprises providing a logical model to logically describe the physical fields, the logical model comprising logical fields corresponding to respective physical fields; receiving an abstract query defined with respect to a logical model comprising logical fields corresponding to respective physical fields, the abstract query comprising a condition and at least two combined result fields selected from the logical fields of the logical model; and transforming the abstract query into an executable query containing at least one combinatorial statement, the abstract query comprising a condition and at least two combined result fields selected from the logical fields of the logical model, each result field having executable counterparts in the combinatorial statement of the executable query.

In another embodiment, a method allows for query building. The method comprises providing a graphical user interface allowing user selection and arrangement of logical result fields selected from a logical model which logically defines data, wherein a predetermined relative geometric arrangement between user-selected logical result fields defines a combinatorial relationship between the user-selected logical result fields.

In another embodiment, a method allowing for query building comprises providing a graphical user interface allowing user selection and arrangement of logical result fields selected from a logical model which logically defines data, wherein a first predetermined relative geometric arrangement between user-selected logical result fields defines a combinatorial relationship of a first type between the user-selected logical result fields and wherein a second predetermined relative geometric relationship between user-selected logical result fields defines a combinatorial relationship of a second type between the user-selected logical result fields.

In another embodiment, a method allowing for query building comprises providing a graphical user interface allowing user selection and arrangement of logical result fields selected from a logical model which logically defines data, the graphical user interface comprising a table comprising a plurality of cells, wherein a predetermined relative geometric arrangement between user-selected logical result fields in adjacent cells defines a combinatorial relationship between the user-selected logical result fields.

In another embodiment, a method for building queries comprises providing a logical model to logically describe the physical fields, the logical model comprising logical fields corresponding to respective physical fields; providing a graphical user interface allowing user selection and arrangement of logical result fields selected from the logical model; receiving user input specifying a selection and a location, in the graphical user interface, of a first logical result field; receiving user input specifying a selection and a location, in the graphical user interface, of a second logical result field, wherein the first and second logical result fields have a relative geometric relationship and define at least a portion of an abstract query; and transforming the abstract query into an executable query containing at least one combinatorial statement containing representations of the first and second logical result fields, and being generated as a result of the relative geometric relationship.

Yet another embodiment provides a computer readable medium containing a graphical user interface program which, when executed, performs an operation for building abstract queries defined with respect to a logical model comprising a plurality of logical field definitions mapping to physical fields of physical entities of the data. The operation comprises receiving user input specifying a selection and a location, in the graphical user interface, of a first logical result field; wherein the graphical user interface allows user selection of logical result fields from the logical model and supports relationships between user selected logical result fields; and receiving user input specifying a selection and a location, in the graphical user interface, of a second logical result field, wherein the first and second logical result fields define at least a portion of an abstract query, which is transformed into an executable query containing at least one combinatorial statement containing counterparts of the first and second logical result fields.

Yet another embodiment provides a computer readable medium containing a program which, when executed, performs an operation for building abstract queries defined with respect to a logical model comprising a plurality of logical field definitions mapping to physical fields of physical entities of the data. The operation comprises receiving user input specifying a selection and a location, in a graphical user interface, of a first logical result field; wherein the graphical user interface allows user selection and arrangement of logical result fields selected from the logical model; receiving user input specifying a selection and a location, in the graphical user interface, of a second logical result field, wherein the first and second logical result fields have a relative geometric relationship and define at least a portion of an abstract query; and transforming the abstract query into an executable query containing at least one combinatorial statement containing counterparts of the first and second logical result fields, and being generated as a result of the relative geometric relationship.

Still another embodiment provides a computer system, comprising memory and at least one processor, and further comprising a logical model comprising a plurality of logical field definitions mapping to physical fields of physical entities of data, whereby the logical model provides a logical view of the data; and a graphical user interface allowing user selection and arrangement of logical result fields selected from the logical model; wherein the graphical user interface comprises input cells for user-selected logical result fields and wherein a predefined geometric relationship between cells specifies which of two or more combinatorial statement types user-selected logical result fields in the cells are related according to.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
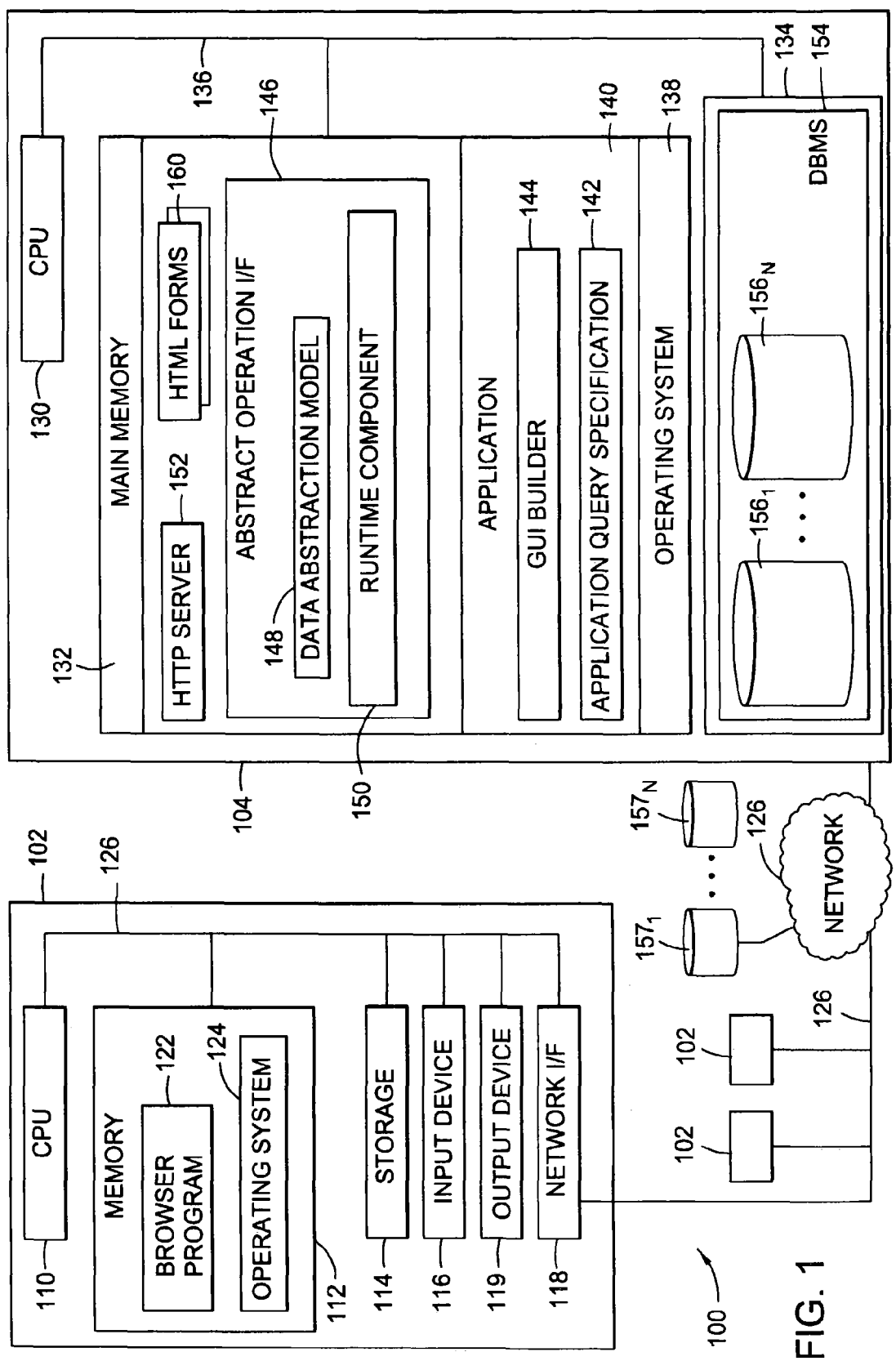
FIG. 1 is a block diagram of an illustrative computer architecture.

One embodiment of the invention is implemented as a program product for use with a computer system and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention provide for query building. In one embodiment, a user specifies a condition or conditions (e.g., as in a WHERE clause of an SQL query) as well as result criteria (e.g., as in a SELECT clause). Combinatorial statements relate the components of the result criteria according to the results sought. For example, combinatorial statements include JOIN, UNION, EXCEPT and their respective family members (e.g., INNER, OUTER, LEFT and RIGHT in the case of JOINs). For convenience and for purpose of illustration, JOINs and UNIONs will be emphasized. However, it is understood that the invention is not limited to particular types of combinatorial statements, nor is the invention related to a particular query language. Thus, references to SQL are merely for purposes of illustration and are not limiting of the invention, which is equally applicable to any query language, known or unknown.

In one embodiment, a particular data definition framework, also referred to herein as a data abstraction model (DAM), is provided for querying data independent of the particular manner in which the data is physically represented. The DAM includes metadata describing and defining a plurality of logical fields which map to physical data. However, although embodiments of the invention are described with respect to queries built and executed with respect to a logical model, the invention is not limited to any particular logical model. Accordingly, the embodiments disclosed herein are merely illustrative.

Physical View of Environment

FIG. 1 depicts a block diagram of a networked system 100 in which embodiments of the present invention may be implemented. In general, the networked system 100 includes a client (i.e., generally any requesting entity such as a user or application) computer 102 (three such client computers 102 are shown) and at least one server computer 104 (one such server computer 104 is shown). The client computer 102 and the server computer 104 are connected via a network 126. In general, the network 126 may be a local area network (LAN) and/or a wide area network (WAN). In a particular embodiment, the network 126 is the Internet. However, it is noted that aspects of the invention need not be implemented in a distributed environment. As such, the client computers 102 and the server computer 104 are more generally representative of any requesting entity (such as a user or application) issuing queries and a receiving entity configured to handle the queries, respectively.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DAMM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements enibodying the various aspects of the invention. The applications 140 (and more generally, any requesting entity, including the operating system 138 and, at the highest level, users) issue queries against a database. Illustrative sources against which queries may be issued include local databases 1561 ... 156N, and remote databases 1571 ... 157N, collectively referred to as database(s) 156–157. Illustratively, the databases 156 are shown as part of a database management system (DBMS) 154 in storage 134. More generally, as used herein, the term "databases" refers to any collection of data regardless of the particular physical representation. By way of illustration, the databases 156–157 may be organized according to a relational schema (accessible by SQL queries) or according to an XML schema (accessible by XML queries). However, the invention is not limited to a particular schema and contemplates extension to schemes presently unknown. As used herein, the term "schema" generically refers to a particular arrangement of data which is described by a data repository abstraction 148.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by the data abstraction model (DAM) 148 of the abstract query interface 146. The abstract queries are processed by a runtime component 150 which transforms the abstract queries into a form (referred to herein as a concrete query) consistent with the physical representation of the data contained in one or more of the databases 156–157. In particular, this processing is performed by a physical query builder 161 of the runtime component 150. The runtime component 150 also includes an analysis tool 162, so-called because it enables a data analysis feature described herein. Illustratively, the analysis tool 162 includes a DAM generator 164, a query augmenter 166 and a table builder 168. It is noted that the functions of the runtime component 150 are merely illustrative. Persons skilled in the art will recognize that these functions may be implemented elsewhere (e.g., in the database management system 154 itself). Each of the components/functions of the abstract query interface 146 is further described below.

The abstract queries processed by the runtime component 150 may be configured to access the data and return results, or to modify (i.e., insert, delete or update) the data. In one embodiment, elements of a query are specified by a user through a graphical user interface (GUI). The content of the GUIs is generated by the application(s) 140, and in particular by a graphical user interface (GUI) builder 144. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156–157 invoke an application 140. When executed by the processor 130, the application 140 causes the server computer 104 to perform the steps or elements embodying the various aspects of the invention, including accessing the database(s) 156–157. In one embodiment, the application 140 comprises a plurality of servlets configured to build GUI elements, which are then rendered by the browser program 122. Where the remote databases 157 are accessed via the application 140, the data abstraction model 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Logical/Runtime View of Environment

Figure 2A:
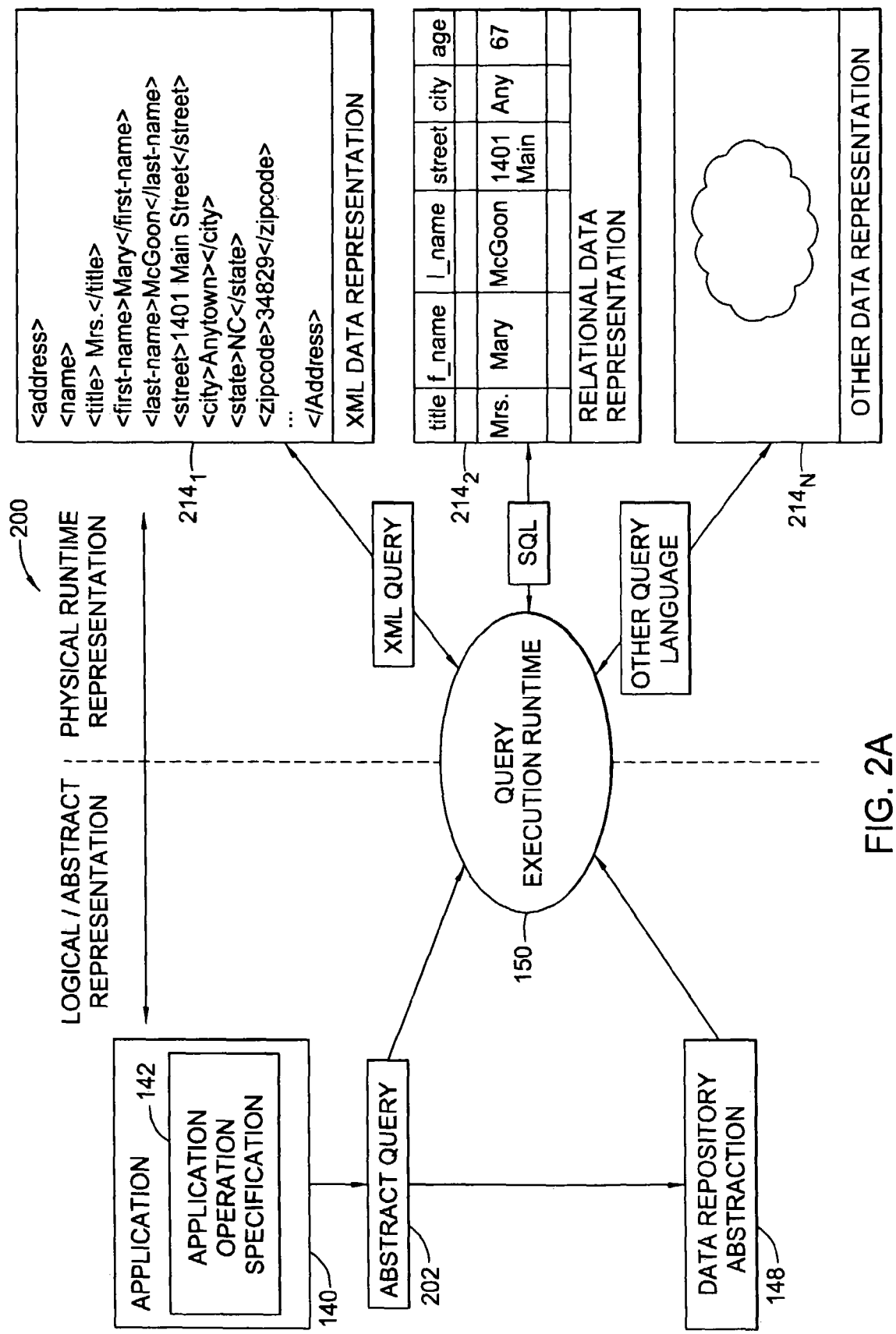
FIG. 2 is a relational view of software components of one embodiment of the invention configured to process queries against a physical data source through an abstract representation of the physical data source.
Figure 2B:
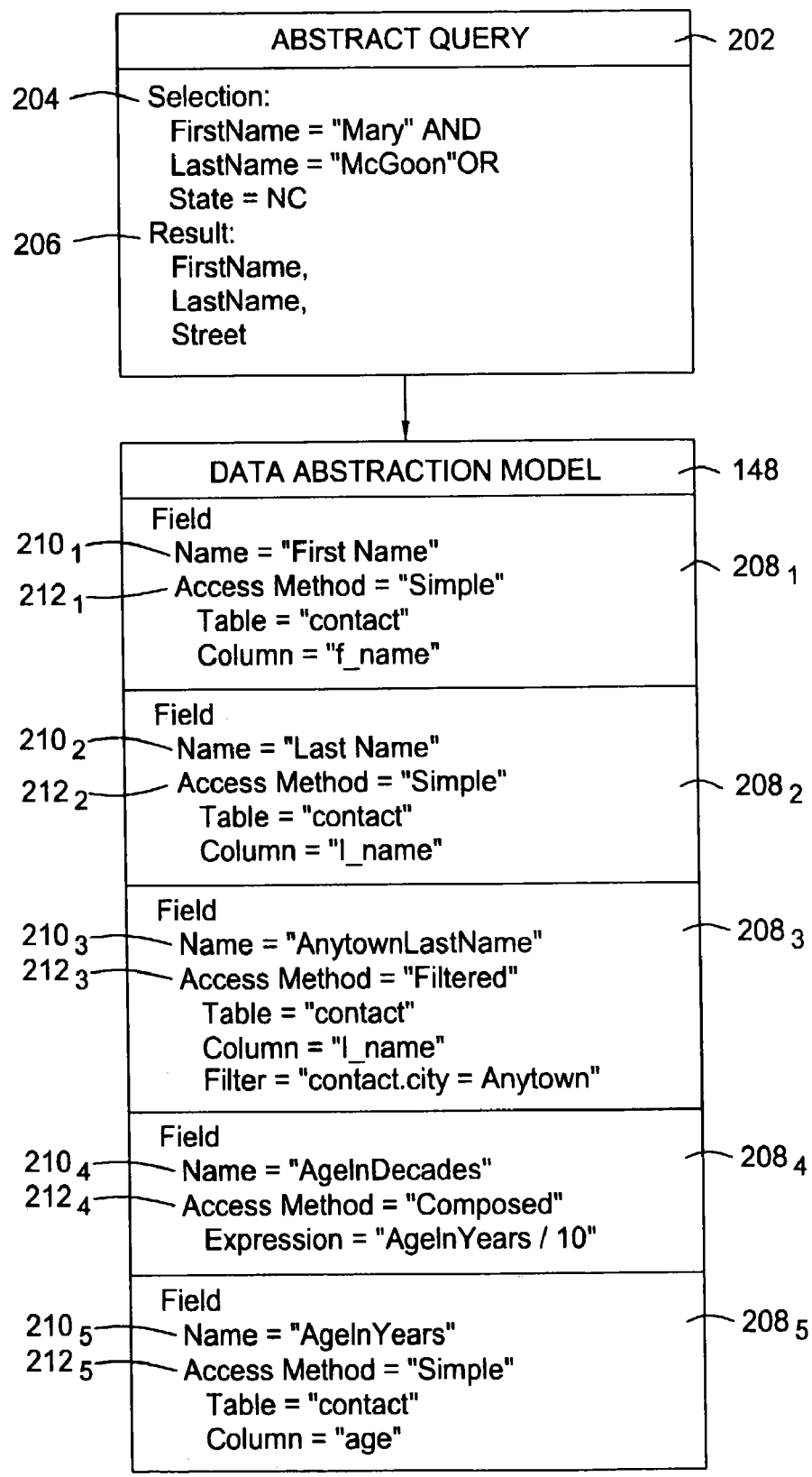

FIGS. 2A–B show a plurality of interrelated components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156–157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data abstraction model 148. In general, the data abstraction model 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156–157, thereby allowing queries to be formed that are loosely coupled to the underlying data representation. The data to which logical fields of the DAM 148 are mapped may be located in a single repository (i.e., source) of data or a plurality of different data repositories. Thus, the DAM 148 may provide a logical view of one or more underlying data repositories. By using an abstract representation of a data repository, the underlying physical representation can be more easily changed or replaced without affecting the application making the changes. Instead, the abstract representation is changed with no changes required by the application. In addition, multiple abstract data representations can be defined to support different applications against the same underlying database schema that may have different default values or required fields.

In general, the data abstraction model 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ . . . $214_N$ in a database (e.g., one of the databases 156) according to parameters referred to herein as physical location parameters. By way of illustration, two data representations are shown, an XML data representation $214_1$ and a relational data representation $214_2$. However, the physical data representation $214_N$ indicates that any other data representation, known or unknown, is contemplated.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact", where the table name and the column name are the physical location parameters of the access method $212_1$. The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is noted that the data abstraction model 148 shown in FIG. 2B is merely illustrative of selected logical field specifications and is not intended to be comprehensive. As such, the abstract query 202 shown in FIG. 2B includes some logical fields for which specifications are not shown in the data abstraction model 148, such as "State" and "Street".

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data abstraction model 148 shown in FIG. 2A are representative of logical fields mapped to data represented in the relational data representation $214_2$. However, other instances of the data abstraction model 148 map logical fields to other physical data representations, such as XML. Further, in one embodiment, a data abstraction model 148 is configured with access methods for procedural data representations.

An illustrative abstract query corresponding to the abstract query 202 shown in FIG. 2 is shown in Table I below. By way of illustration, the data repository abstraction 148 is defined using XML. However, any other language may be used to advantage.

TABLE I

QUERY EXAMPLE

```
001   <?xml version="1.0"?>
002   <!--Query string representation: (FirstName = "Mary" AND
003   LastName = "McGoon") OR State = "NC"-->
004   <QueryAbstraction>
005     <Selection>
006       <Condition internalID="4">
007         <Condition field="FirstName" operator="EQ" value="Mary"
008   internalID="1"/>
009         <Condition field="LastName" operator="EQ" value=
010   "McGoon" internalID="3" relOperator="AND"></Condition>
011       </Condition>
012       <Condition field="State" operator="EQ" value="NC"
013   internalID="2" relOperator="OR"></Condition>
014     </Selection>
015     <Results>
016       <Field name="FirstName"/>
017       <Field name="LastName"/>
018       <Field name="State"/>
019     </Results>
020   </QueryAbstraction>
```

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data abstraction model 148 corresponding to the abstract query in Table I is shown in Table II below. By way of illustration, the data abstraction model 148 is defined using XML. However, any other language may be used to advantage.

TABLE II

DATA ABSTRACTION MODEL EXAMPLE

```
001   <?xml version="1.0"?>
002   <DataRepository>
003     <Category name="Demographic">
004     <Field queryable="Yes" name="FirstName" displayable="Yes">
005       <AccessMethod>
006         <Simple columnName="f_name"
              tableName="contact"></Simple>
007       </AccessMethod>
008       <Type baseType="char"></Type>
009     </Field>
010     <Field queryable="Yes" name="LastName" displayable="Yes">
011       <AccessMethod>
012         <Simple columnName="l_name"
              tableName="contact"></Simple>
013       </AccessMethod>
014       <Type baseType="char"></Type>
015     </Field>
016     <Field queryable="Yes" name="State" displayable="Yes">
017       <AccessMethod>
```

TABLE II-continued

DATA ABSTRACTION MODEL EXAMPLE

```
018         <Simple columnName="state"
              tableName="contact"></Simple>
019       </AccessMethod>
020       <Type baseType="char"></Type>
021     </Field>
022   </Category>
023   </DataRepository>
```

Note that lines 004–009 correspond to the first field specification $208_1$ of the DAM 148 shown in FIG. 2B and lines 010–015 correspond to the second field specification $208_2$. For brevity, the other field specifications defined in Table I have not been shown in FIG. 2B. Note also that Table I illustrates a category, in this case "Demographic". A category is a grouping of one or more logical fields. In the present example, "First Name", "Last Name" and "State" are logical fields belonging to the common category, "Demographic".

In any case, a data abstraction model 148 contains (or refers to) at least one access method that maps a logical field to physical data. However, the foregoing embodiments are merely illustrative and the logical field specifications may include a variety of other metadata. In one embodiment, the access methods are further configured with a location specification defining a location of the data associated with the logical field. In this way, the data abstraction model 148 is extended to include description of a multiplicity of data sources that can be local and/or distributed across a network environment. The data sources can be using a multitude of different data representations and data access techniques. In this manner, an infrastructure is provided which is capable of capitalizing on the distributed environments prevalent today. One approach for accessing a multiplicity of data sources is described in more detail in U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

Figure 3:
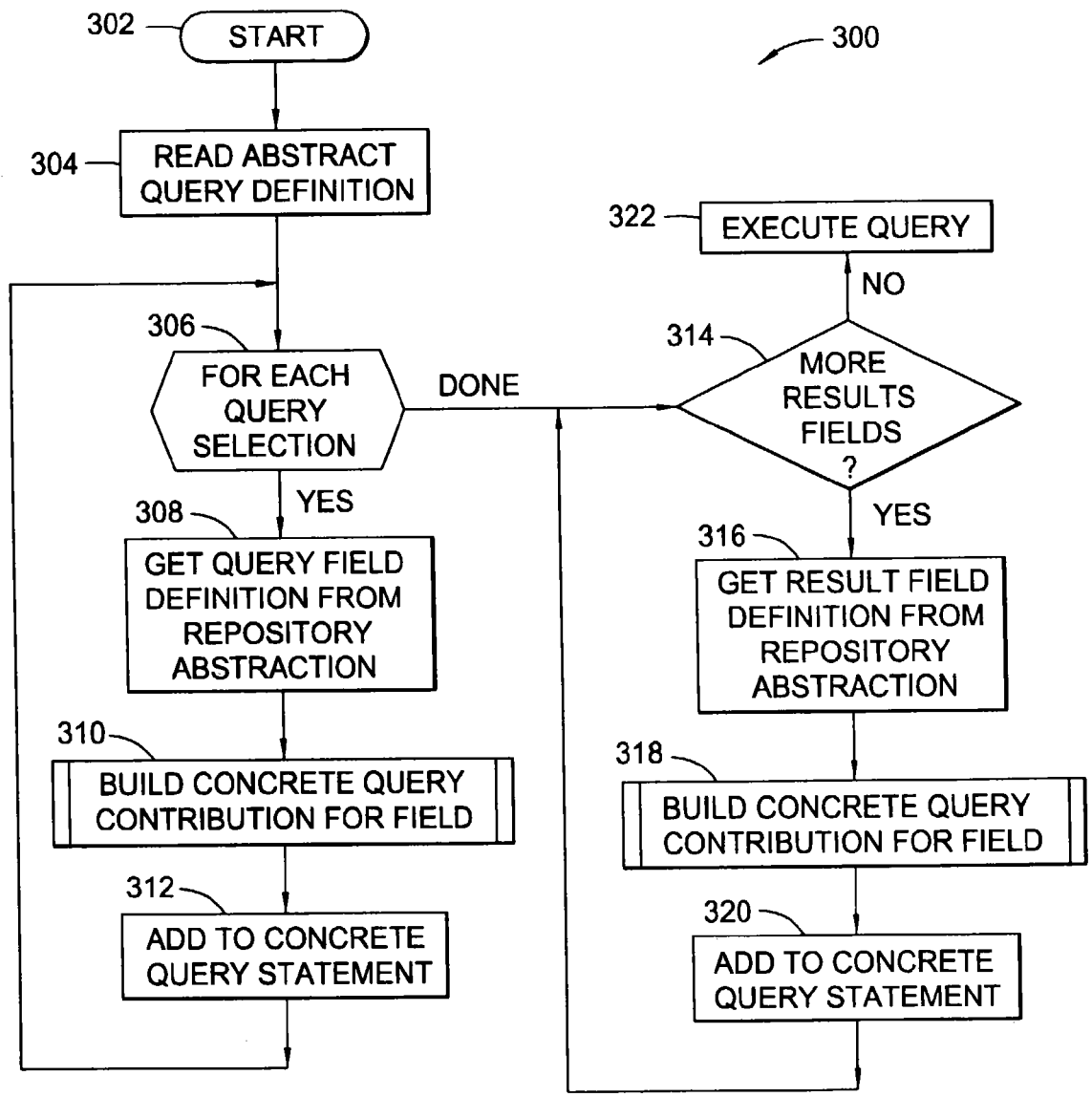
FIG. 3 is a flow chart illustrating the operation of a runtime component.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156–157 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Graphical User Interfaces

As noted above, one embodiment provides the user with a GUI through which queries may be composed and executed. The GUI screens (e.g., built by the GUI builder 144 of the application 140) generally provide search criteria and associated values from which a user may select. The selections of the user are used to build the application query specification 142. The query may then be executed in the manner described above.

For purposes of the present description it will be helpful to define some terms. As is evident from the above description, to perform a search for a set of desired database records within the repository 154, a requesting entity (e.g., application 140) builds a query by combining one or more "operands" and "logic operators" to form a search expression. The operands and operators together identify the desired search. Each operand may be a comparison operation (defined by a comparison operator, e.g., >, <, =) which defines a value for a parameter of an element in the repository 154. For instance, an operand may be "(DateOfBirth='1942/01/01')" which represents a request for search results having a "DateOfBirth" parameter equal to a date value of 1942/01/01. Another illustrative operand is "(DateOfBirth>'1942/01/01')" which represents a request for search results having a "DateOfBirth" parameter greater than 1942/01/01. Two or more operands can be related by a logic operator representing a logical relationship between operands. Logic operators are logical connectors, such as logical AND, OR, and NOT. Each operand, or operand with a logic operator, defines a single search criterion.

For purposes of the present description, a singular operand is referred to herein as a "simple condition" or just "condition". Two or more operands/conditions related by a logic operator form a "complex condition" or "compound condition". A simple condition or complex condition may make up a portion of a search expression (i.e., a query) which is executed by the application 140.

Referring now to FIGS. 5–16, a series of graphical user interfaces are shown illustrating the user interfaces defined by the application 140. By way of illustration, the graphical user interfaces shown in FIGS. 5–16 are specific to accessing medical data. However, embodiments of the invention may be used to advantage with any type of information including, for example, financial information, employment information, etc. In general, the graphical user interfaces shown in FIGS. 5–16 allow a user to build queries comprising conditions added by the user. Recall that, as defined herein, a simple condition is a comparison operation. An illustrative simple condition is (DateOfBirth='1942/01/01'). Thus, adding a simple condition to a query generally involves allowing the user to select operands and a comparison operator (e.g., >, <, =). In one embodiment, when a user initially invokes the application 140 via the browser program 122, the application 140 (specifically, the GUI builder 144) returns HTML content which is rendered by the browser program 122 in the form of a first GUI 600, shown in FIG. 5. The GUI 600 is the first of a series of screens which a user uses to add a condition to a query. In general, the GUI 600 includes a plurality of condition categories 602–610 (each having an associated radio button) from which a user may select. The condition categories shown include "demographics" 602, "tests and laboratory results" 604, "reports" 606, "diagnostic using ICD-9" 608, and "diagnostic using DRG" 610. Each of the condition categories has an associated field 612–620 from/into which a value may be selected/input. Some fields (e.g., fields 612–616) are drop-down menus, while others are text boxes (e.g., fields 618–620) for receiving user input. In the latter case, the fields may have associated Browse buttons 622–624 to facilitate user selection of valid values.

Once a condition category and value have been selected, the user clicks on the Next button 626. Clicking the Next button 626 causes the browser program 622 to render (according to information provided by the application 640) the next appropriate graphical user interface necessary to continue the process of adding a condition. In this manner, the user may be presented with a series of graphical user interfaces necessary to add a condition. By way of example, assume that the user has selected the demographic condition category 602 and the "date of birth" value from the drop-down menu 612. Upon pressing the Next button 626, the user is presented with a second GUI 700 shown in FIG. 6. The GUI 700 comprises a comparison operator drop-down menu 702 from which a user may select a comparison operator (e.g., >, <, =) and a date field 704 into which a user may input a date according to a prescribed format (e.g., "yyyy/mm/dd"). The process of adding the date of birth condition is completed when the user clicks on the OK button 706.

Figure 7:
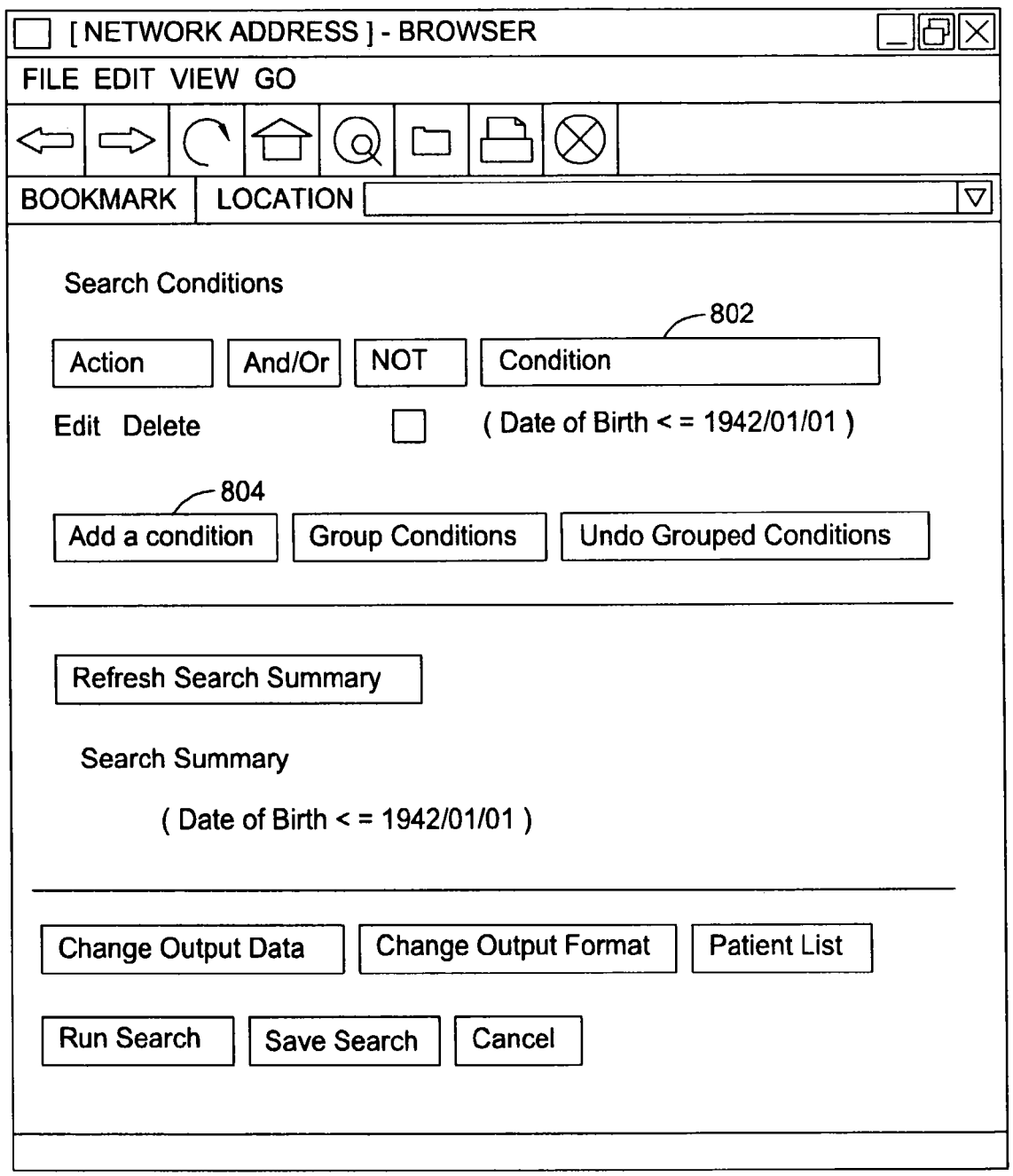
FIG. 7 is a graphical user interface screen displaying existing conditions to a query and from which a user may add additional conditions to the query and execute the query.
Figure 8:
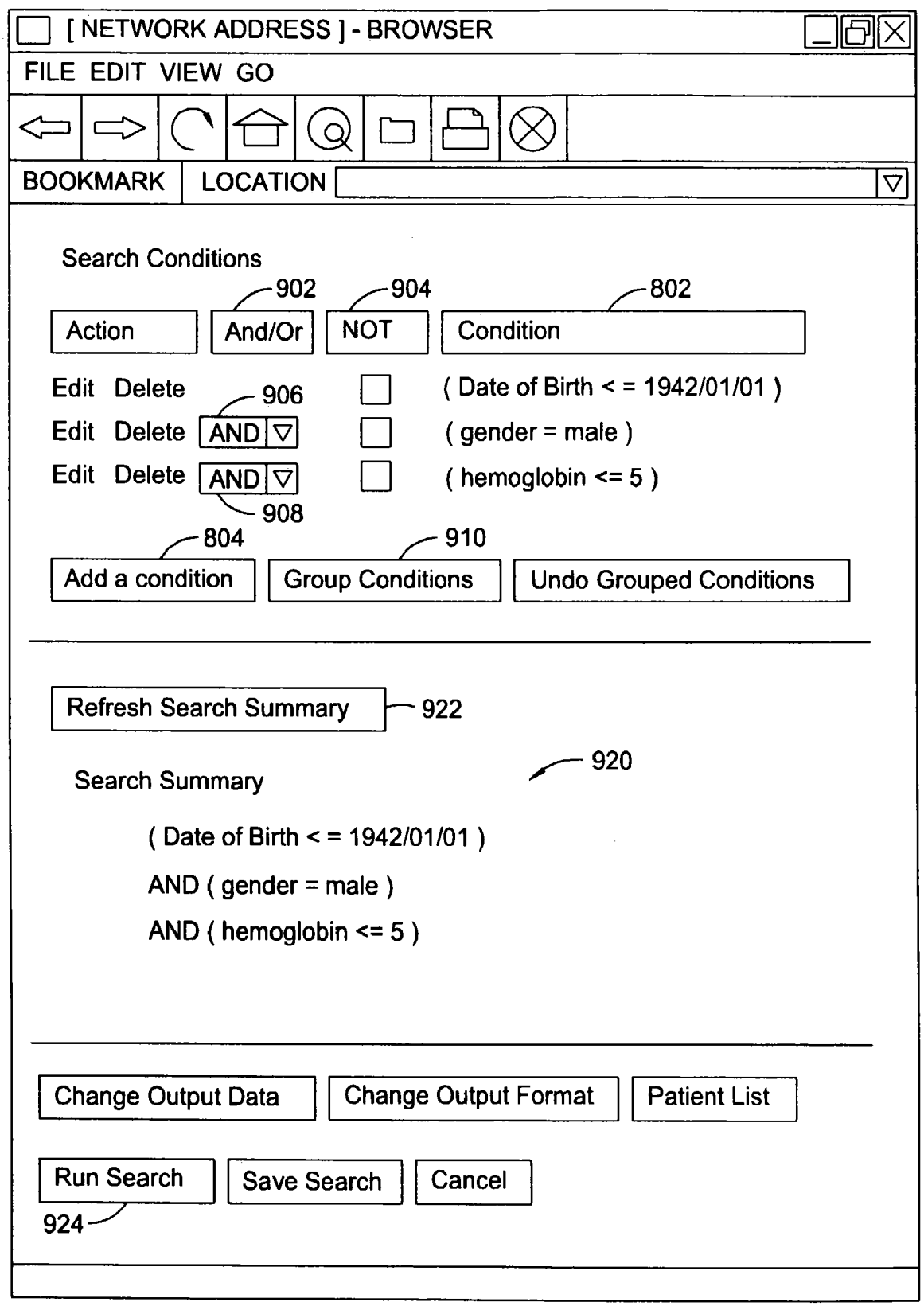
FIG. 8 is the graphical user interface screen of FIG. 4 after being updated with additional conditions.

When the user has completed the process of adding a condition (e.g., such as after clicking the OK button 706), the user is presented with the GUI 800 shown in FIG. 7. The resulting conditions are shown in a condition column 802. In the present example, a first row of the condition column 802 shows the date of birth condition added using the GUIs 600 and 700 described above. The user may add another condition by clicking the "Add a Condition" button 804. By repeating similar steps for each of the other available condition categories and values, any number of conditions may be added to a query. By way of illustration, the refreshed/updated GUI 800 shown in FIG. 8 shows a total of three conditions (including the date of birth condition described above), each of which were added by stepping through the graphical user interfaces for adding a condition (e.g., the GUIs 600 and 700). Further, although not shown, adding a condition may require any number of other graphical user interfaces. In particular, a plurality of additional graphical user interfaces may be required for more complicated conditions, such as ranges. The particular number, content, design and elements of such graphical user interfaces may be determined by persons skilled in the art according to aspects of the invention.

After the first condition has been added, each of the subsequent conditions are related to one another to the first condition by a Boolean logic value/operator, referred to herein as a first level Boolean logic value. Referring to FIG. 8, the first level Boolean logic values are shown in a pair of columns 902, 904. The first level Boolean logic values AND and OR are selected from drop-down menus 906, 908 in the first column 902. An AND/OR drop-down menu is located between each condition. Accordingly, in the illustration shown in FIG. 8, a first drop-down menu 906 is located between the "date of birth" condition and the "gender" condition and a second drop-down menu 908 is located between the "gender" condition and a "hemoglobin" condition. In one embodiment, the first level Boolean logic value defaults to AND for each condition added after the first condition. A user may then change the default value to OR using the drop-down menu. Alternatively, the user may negate the condition by checking the appropriate NOT checkbox in the second column 904.

Once two or more conditions have been added to a query, two or more conditions may then be grouped together by Boolean logic values, referred to herein as second level Boolean logic values, to produce complex (or grouped) conditions. An example of a complex condition is ((employeeName='Rich') OR (employeeName='John')). Further, simple conditions and complex conditions may be connected by Boolean logic values to produce a hierarchy of conditions. In one embodiment, the first graphical element used to group conditions together is a "Group Conditions" button 910.

Figure 9:
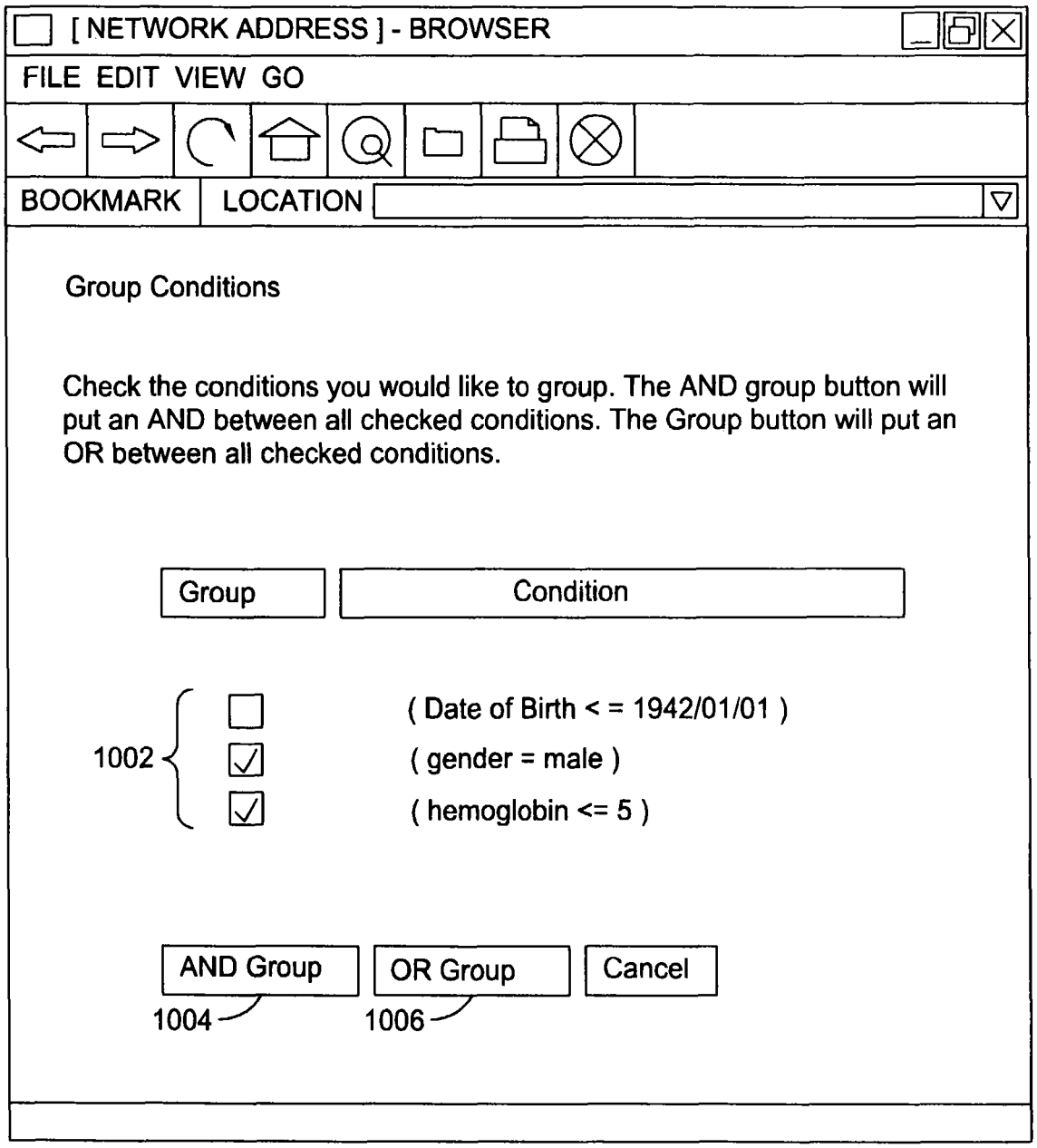
FIG. 9 is a graphical user interface screen from which a user may group conditions to form a complex condition.

In one embodiment, pressing the "Group Conditions" button 910 causes the application 140 to generate the GUI 1000 shown in FIG. 9. The GUI 1000 displays each of the available conditions and an associated checkbox 1002 for each condition. The user selects which conditions are to be grouped together by checking the appropriate checkbox 1002. Illustratively, the "gender" and the "hemoglobin" conditions are selected. The GUI 1000 further provides and "AND Group" button 1004 and an "OR Group" button 1006, for ANDing or ORing the selected groups. Assume, by way of illustration, that a user clicks the "AND Group" button 1004. The result of this action is shown by the updated GUI 800 in FIG. 10. Specifically, only two conditions 1102, 1104 remain, with the second condition 1104 being a complex condition comprising to sub conditions related by a Boolean AND. Further, the two conditions 1102, 704 are themselves related by a Boolean AND, shown in the drop-down menu 906.

Assume now that a user desires to ungroup the second condition 1104. To facilitate this task, the GUI 900 (shown in FIG. 10) includes an "Undo Grouped Conditions" button 1106. Pressing the "Undo Grouped Conditions" button 1106 causes the application 140 to generate the GUI 1200 shown in FIG. 11. The GUI 1200 displays each of the existing conditions and an associated checkbox 1202. In alternative embodiment, only the complex conditions (such as the second condition 1104 in this case) are shown in the GUI 1200. In any event, to ungroup a complex condition, the user checks the appropriate checkbox 1202 and then clicks the OK button 1204. In this case, the result of ungrouping the second condition 1104 is shown by the GUI 900 and FIG. 8. That is, the conditions are returned to their original ungrouped states.

Figure 10:
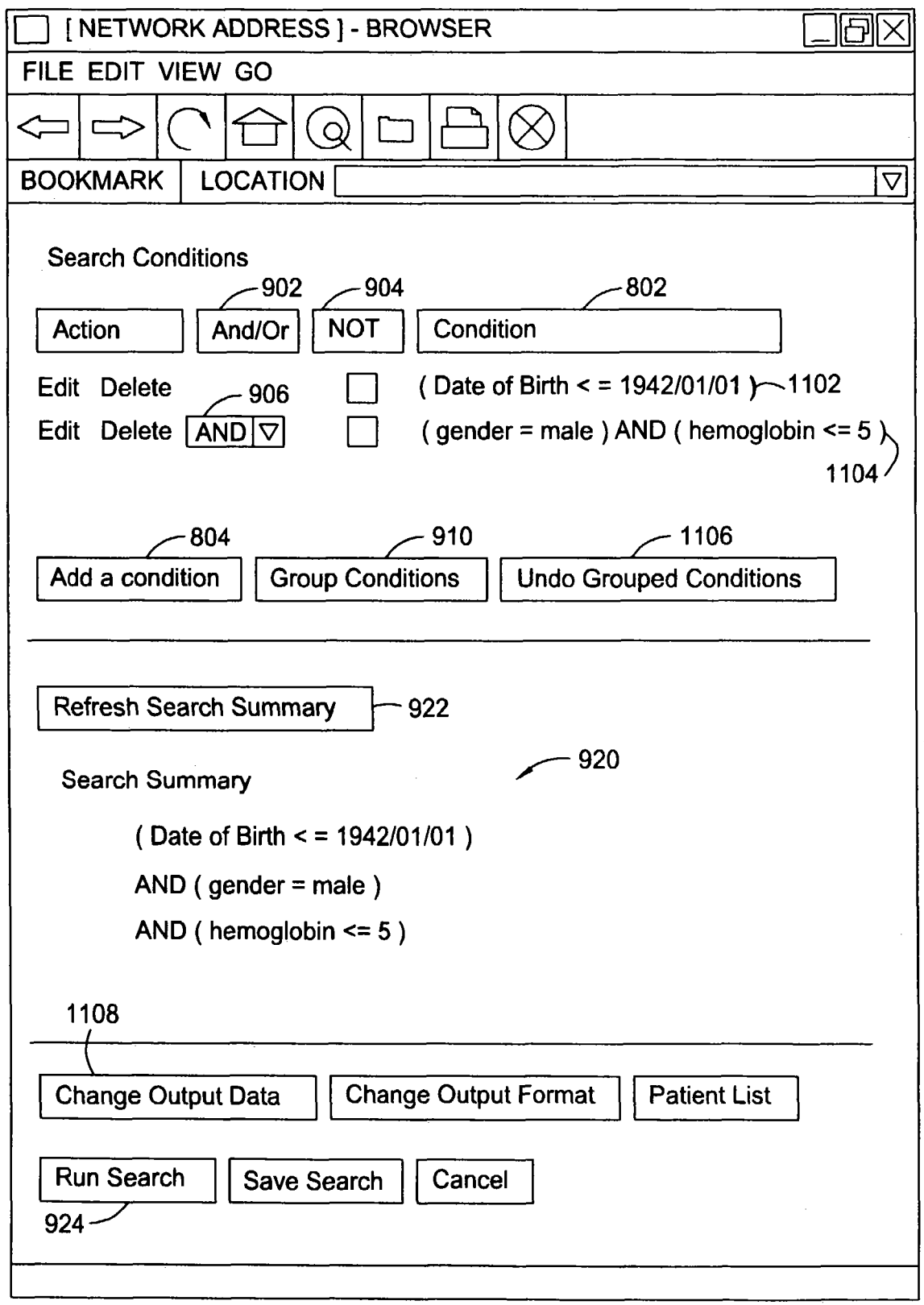
FIG. 10 is the graphical user interface screen of FIG. 4 after having been updated to reflect grouped conditions.
Figure 12:
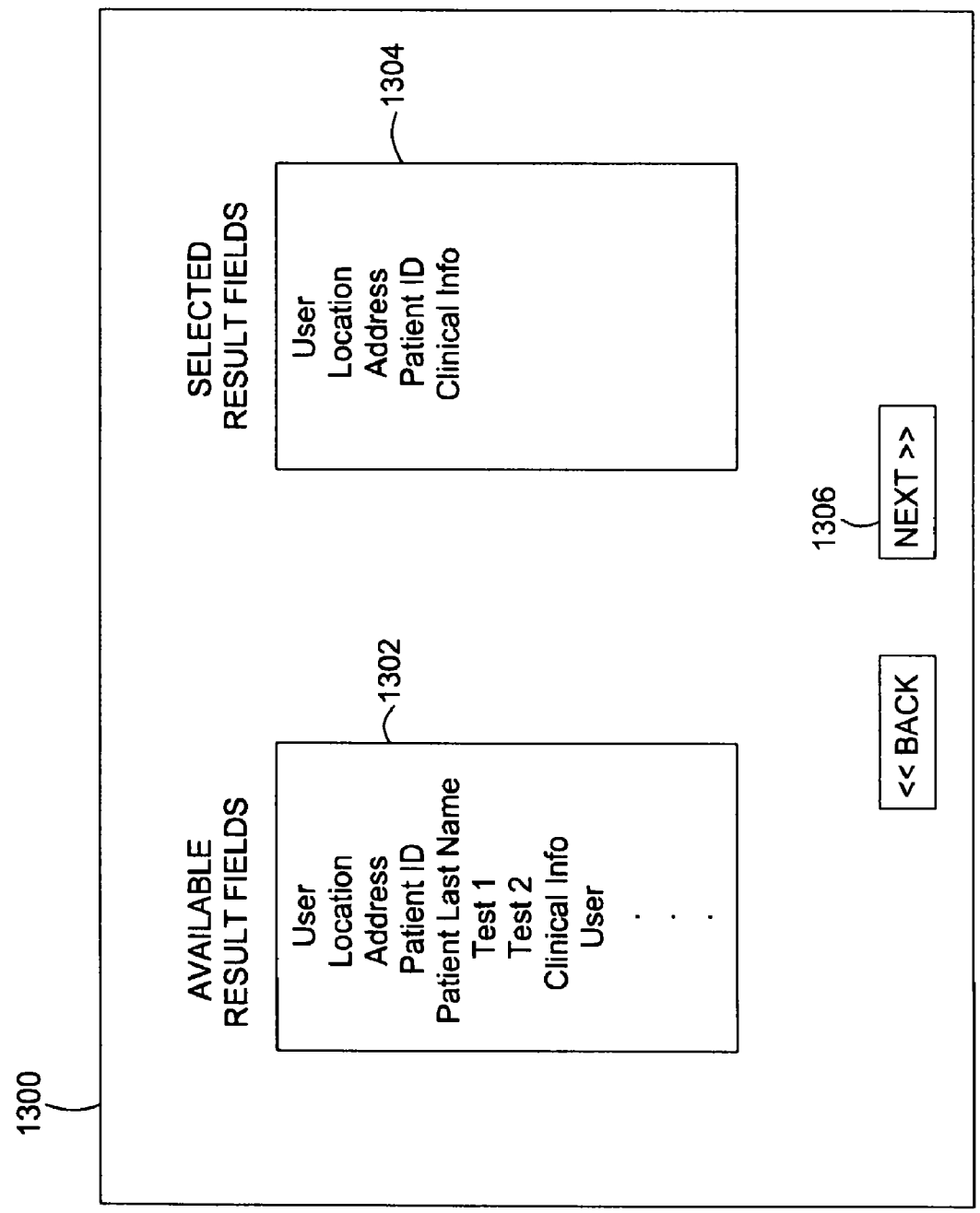
FIG. 12 is a graphical user interface screen from which a user may select result fields to include in a query.
Figure 13:
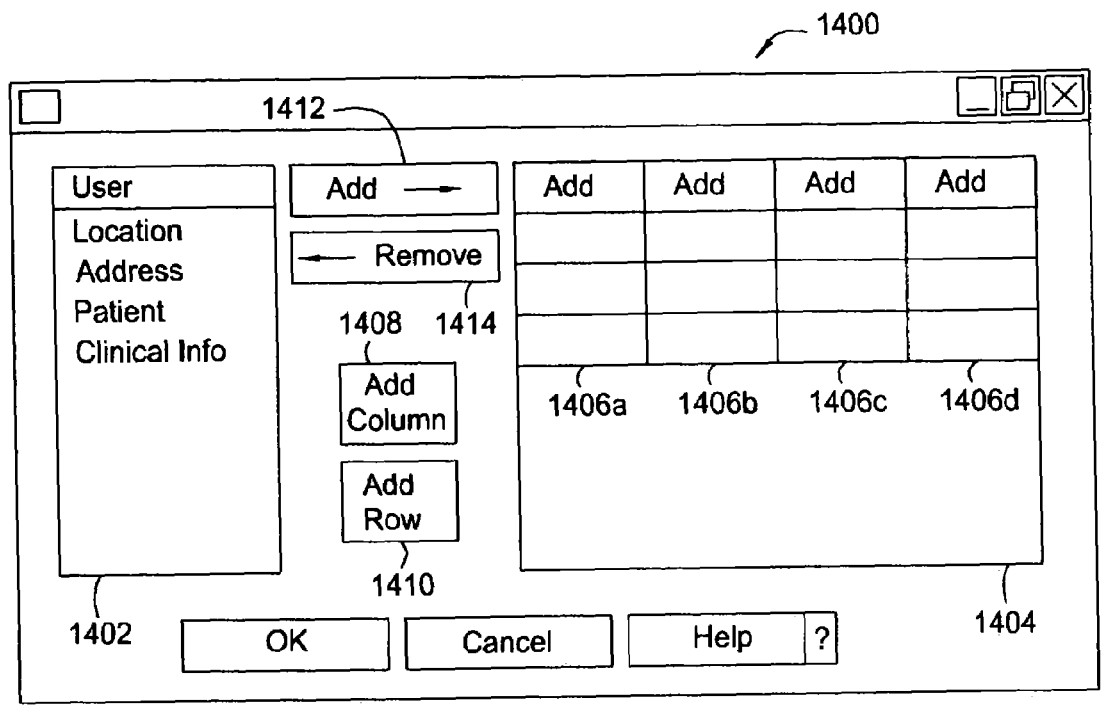
FIGS. 13–15 are graphical user interface screens in which a user UNIONs and/or JOINs selected result fields.

The current structure of a given query may be viewed by a user in a search summary section 920 of the GUI 900 shown in FIG. 8 and FIG. 10. In one embodiment, the query displayed in a search summary section 920 is updated by clicking a "Refresh Search Summary" button 922.

Once the desired conditions have been defined, or even prior to defining the conditions, the user may define result fields (i.e., the fields the user wants to have returned and which satisfy the condition criteria). In one embodiment, the user clicks a "Change Output Data" button 1108 (shown for example in FIG. 10). In response, the GUI builder 144 renders the Result Field Selection GUI 1300 of FIG. 12. The GUI 1300 includes an Available Result Fields window 1302 and a Selected Result Fields window 1304. The window 1302 displays all available result fields from which a user may select. The window 1304 displays the fields selected by the user. In the present example, the user has selected Location, Address, Patient ID, Clinical Information and User. In one embodiment, the GUI 1300 is drag-and-drop enabled to facilitate selection of result fields. After making the desired selections, the user presses the Next button 1306 and is presented with a Result Field Linking GUI 1400 of FIG. 13.

The Result Field Linking GUI 1400 generally includes a list 1402 of the result fields selected by the user in the Result Field Selection GUI 1300. The GUI 1400 also includes a table 1404 having a plurality of columns 1406A–D (four shown). Each column has a number of cells (three per column shown). For purposes of illustration only, the table 1404 includes four columns, each having three cells. However, the dimensions of the table 1404 may be manipulated by the user as desired. In one embodiment, the user adds another column by clicking the Add Column button 1408, and adds another row to each column by clicking the Add Row button 1410.

Figure 14:
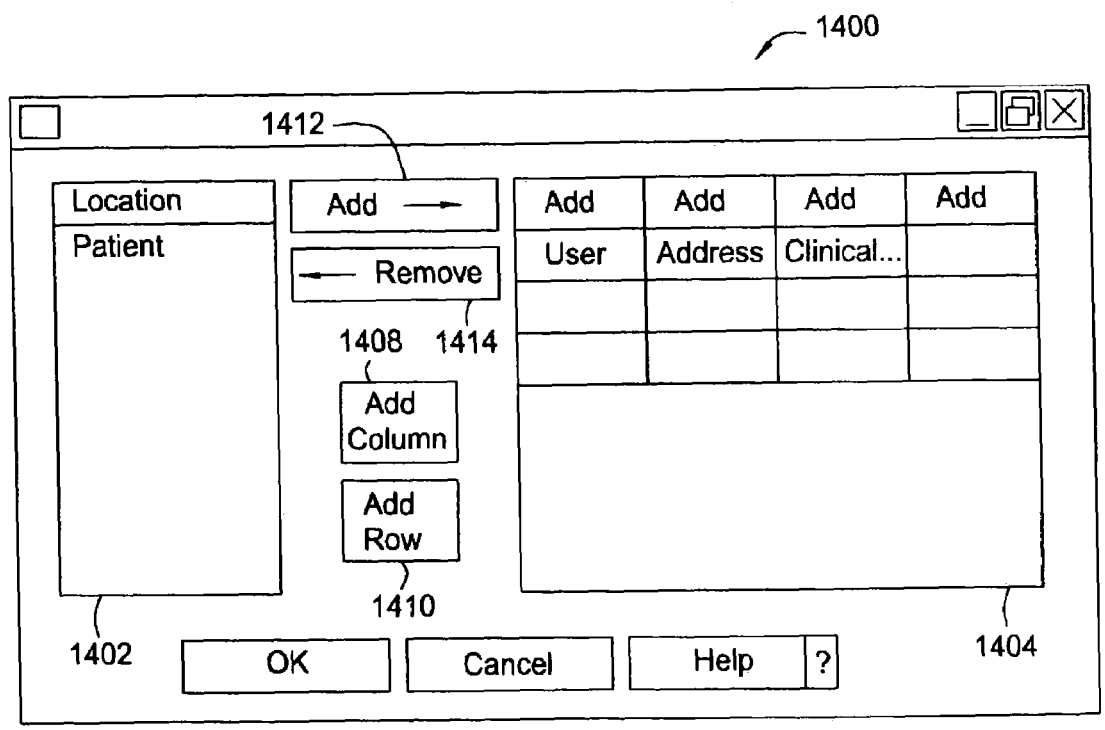

The user determines the structure of the resulting query by selecting the relative position of the available result fields (in the list 1402) in the table 1404. In one embodiment, the user populates the cells of table 1404 by highlighting a selected cell, then highlighting one of the result fields in the list 1402 and then clicking the Add button 1412. Populated cells may be de-populated by clicking the Remove button 1414. In another embodiment, the user simply drags (from the list 1402) and drops a selected result field into a cell of the table 1404. Illustratively, the user populates the first three cells of the first row with User, Address, Clinical info, as shown in FIG. 14. Accordingly, the remaining result fields in the list 1402 are Location and Patient. In one embodiment, fields in adjacent cells on the same row (i.e., horizontally arranged) are JOINed, assuming the fields are in separate tables. Accordingly, and SQL statement corresponding to the table 1404 shown in FIG. 14 is as follows:

Corresponding SQL Statement

SELECT T1.USER, T1.ADDRESS, T2.CLINICAL_INFO FROM TABLE1 T1, TABLE2 T2

Figure 15:
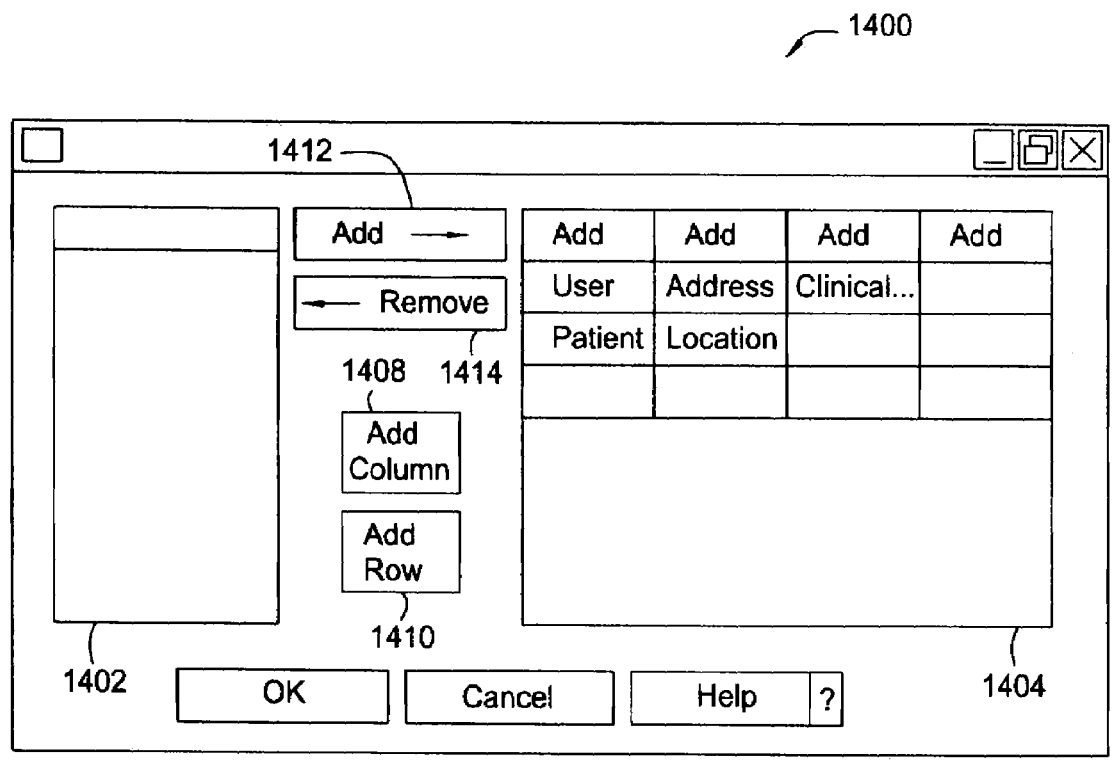

In one embodiment, fields arranged in a vertical manner are UNIONed. For example, FIG. 15 shows an arrangement in which Patient and Location have been added to the corresponding cells in the next row directly below User and Address, respectively. Accordingly, Patient and User have been UNIONed and Location and Address have been UNIONed. Note that the cell directly below Clinical Info is empty. In an SQL statement this empty cell will be accounted for with a NULL value. Accordingly, the corresponding SQL statement for this arrangement is as follows:

Corresponding SQL Statement

SELECT USER, ADDRESS, CLINICAL_INFO FROM TABLE1 UNION SELECT PATIENT AS USER, LOCATION AS ADDRESS, NULL, FROM TABLE2.

Accordingly, one embodiment of the user interface of the present invention gives a user control over which fields to JOIN and which to UNION in a graphical environment where data is abstractly represented. In general, JOINs would be preferable over UNION where there is correspondence between instances of data between the two data sources. On the other hand, UNION would be preferred when the same data item was defined for two data sources, but with little or no overlap in the instance values. In the foregoing example, the user may have UNIONed the selected fields thinking that the fields of each UNION are similar and, therefore, the results of the query should return both fields of each UNION. Although both fields are returned, the fields are appended to each other in one column and, therefore, returned as one viewable field. Duplicate data will be removed.

In addition to giving a user the flexibility to JOIN or UNION fields, it is contemplated that the user is also able to sort the order of the results. That is, the order of the results is sorted according to the order (i.e., left to right) of the fields in the various cells of the table 1404. In this way, the user may manipulate the relative positioning of each of the available result fields to return the desired results and control the order in which the results are returned.

It should be noted that the above embodiments are merely illustrative and not limiting. Persons skilled in the art will recognize other embodiments with the scope of the invention. For example, in one embodiment, the table 1404 may be "pre-populated" with selected fields. Thus, an administrator may specify a particular arrangement of user-selected fields. Alternatively, a user may save a particular arrangement of fields. As an example, after clicking the Next button 1306 of the GUI 1300 (FIG. 12), the user may be presented with the GUI 1400 of FIG. 14, in which User, Address and Clinical Info are already assigned default cells of the first row. Although not shown, more than one row may be pre-populated, and some cells may be UNIONed by default. The user may then arrange the relative position of remaining available result fields in the list 1402 (i.e., Location and Patient), or may even change the default layout (i.e., User, Address and Clinical Info). In this regard is noted that administrators may not be in the best position to determine which fields can be UNIONed, given that they likely do not have sufficient understanding of the underlying data. Accordingly, it is contemplated that best-guess estimates can be made on whether certain fields should be UNIONed (i.e., vertically related in the query creation table 1404) or JOINed horizontally. For example, a best-guess estimates can be accomplished by running DAMs through an algorithm to determine which logical fields are similar to one another, either by virtue of being synonyms or having the same data type and length. For example, two tables containing patient information are likely to have very similar schemas, excepting sub-table/super-table definitions where one table simply has more information than the other. In contrast, a patient table and an employee table will have some common information (e.g., name, address) but each will have a significant amount of different information relative to the other (e.g., job description, manager, patient ID). A best-guess estimate algorithm would recognize that the patient and employee tables should be JOINed, but the two patient tables should be UNIONed.

Figure 16:
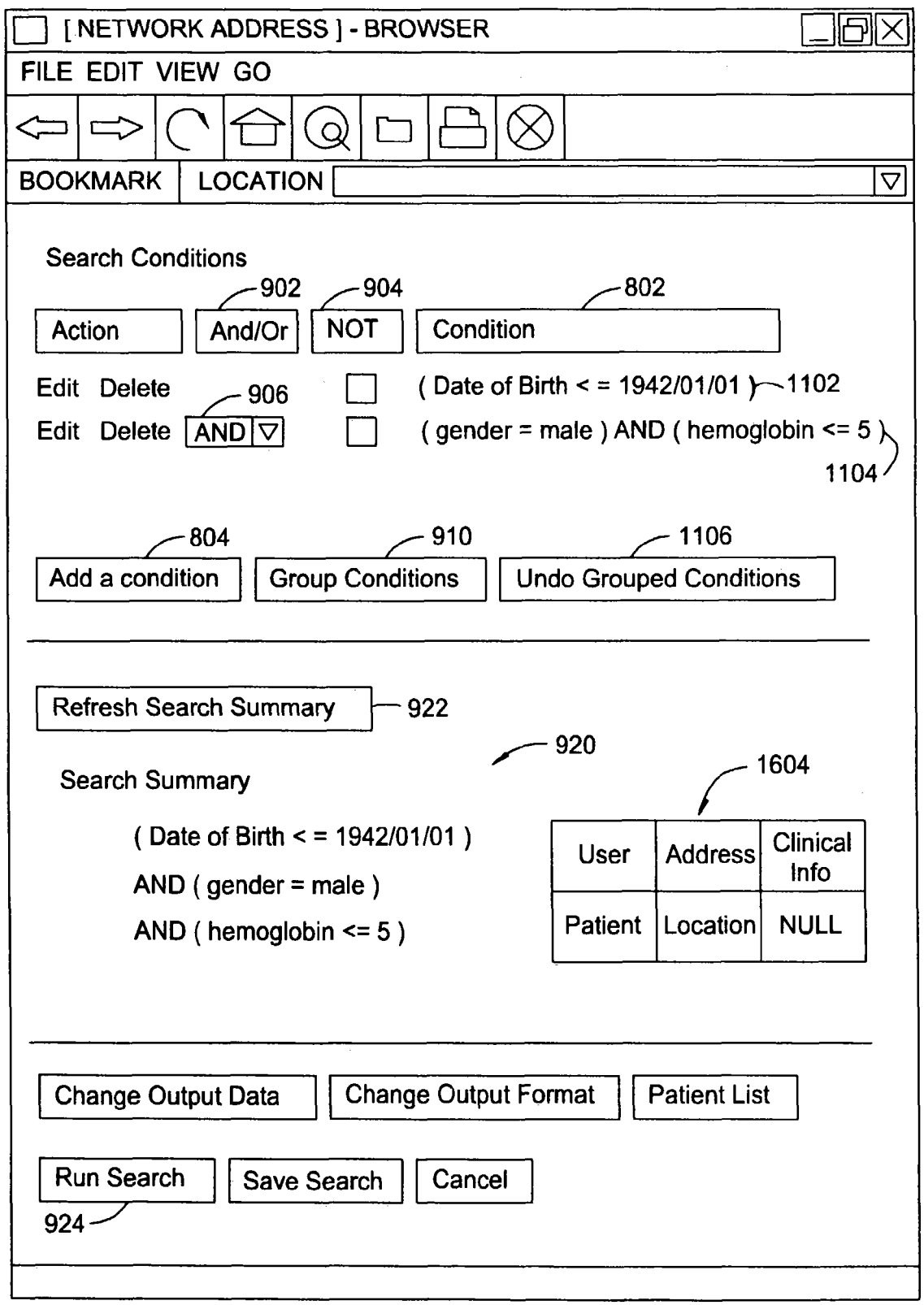
FIG. 16 is the graphical user interface screen of FIG. 11 after being updated with result field selections.

Once the result fields have been arranged to return the desired result, the user clicks on an OK button 1502, shown in FIG. 15. Upon clicking the OK button 1502, any empty columns and/or rows are removed from the query creation table 1404. The user is then returned to a refreshed instance of the GUI 800, as shown in FIG. 16. Note that the summary section 920 now includes a result field specification 1604 as defined in the table 1404 of FIG. 15. If the user is satisfied with query has been built, the user may execute the query by pressing the "Run Search" button 924. In particular, pressing the "Run Search" button 924 invokes the runtime component 150, which performs the execution.

In one embodiment, pressing the "Run Search" button 924 first causes the query as specified in the summary section 920 to be rendered in an abstract form. The resulting abstract query is then executed in the manner described above with respect to FIGS. 3 and 4.

Figure 17:
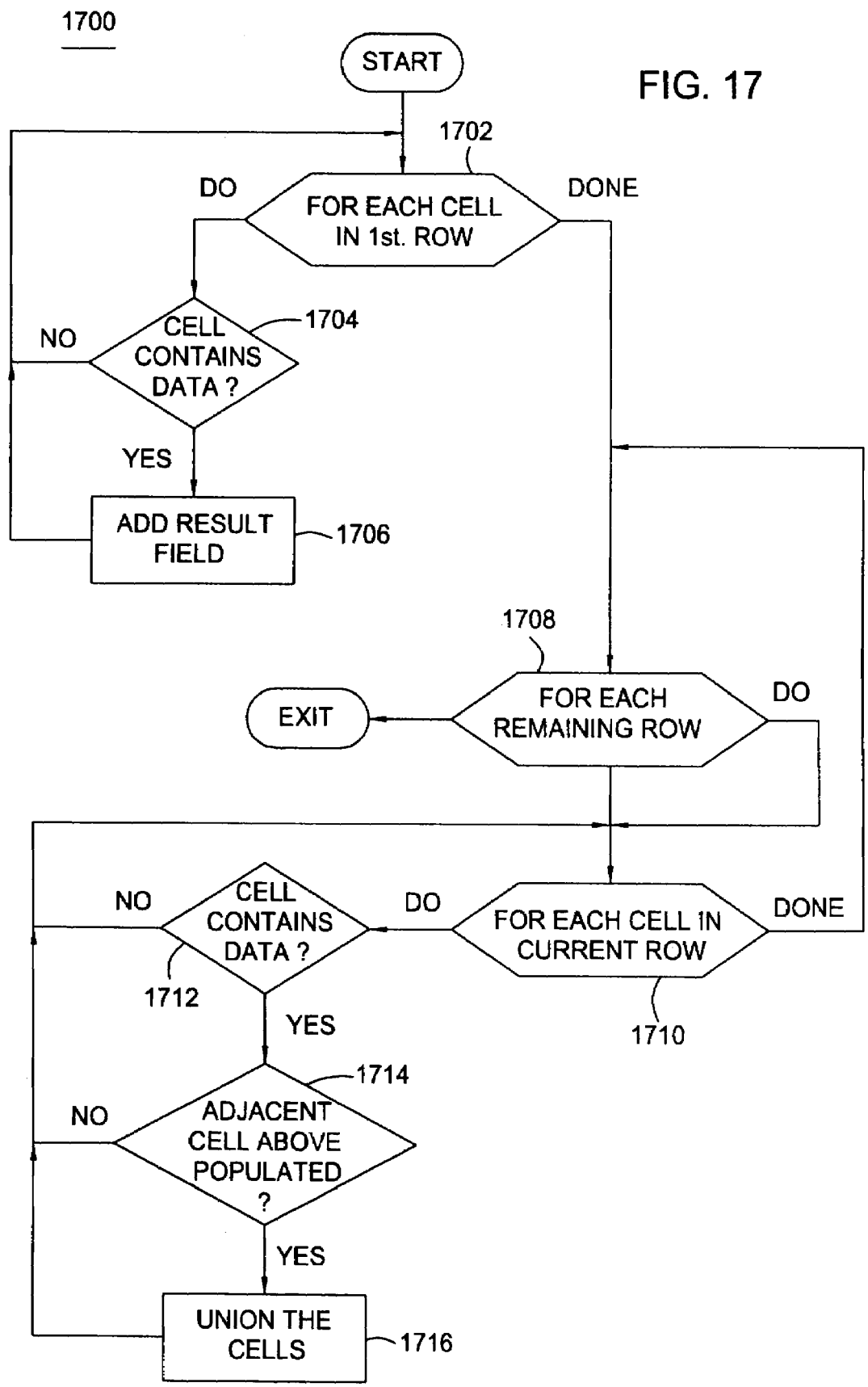
FIG. 17 it is a flow chart illustrating generation of an abstract query including a UNION statement.

One embodiment of a method 1700 for rendering the abstract query based on a user-specified result field layout (e.g., as specified by the table 1404 of FIG. 15) is described with reference to FIG. 17. For purposes of the present illustration it is assumed that the query creation table 1404 does not include any empty columns or rows, although individual cells may be empty. The method 1700 begins processing with the first row in the query creation table 1404. In particular, the method 1700 enters a loop (at step 1702) which iterates for each cell in the first row in the query creation table 1404. The cell is examined to determine whether it contains data, i.e., a result field (step 1704). If not, the method 1700 returns to step 1702 to start processing the next cell for the first row. For a cell that does contain a result field, however, the result field name is added as a component of the abstract query (step 1706), and processing then returns to step 1702. Once each of the cells in the first row have been processed according to the loop entered at step 1702, the method 1700 proceeds to step 1708.

At step 1708, the method 1700 enters a loop for each cell of each remaining row in the query creation table 1404 (loops entered at step 1708 and step 1710). For a given cell of a given row, the method 1700 determines whether the cell contains a result field (step 1712). If not, the method returns to step 1710 to begin processing the next cell. For a given cell that does contain a result field, however, the method 1700 determines whether the adjacent cell directly above the given cell contains data (step 1714). If so, the two cells are UNIONed (step 1716). Once each of the cells of each of the remaining rows has been processed, the method 1700 exits. In this way, each of the vertically related cells (i.e., adjacent cells in a column) are UNIONed.

The result of method 1700 is an abstract query. By way of illustration only, a representative abstract query corresponding to the query creation table 1404 of FIG. 15 is shown below.

EXAMPLE OF ABSTRACT QUERY HAVING UNION

```
<QueryAbstraction version="1.0"
xmlns:xsi="http://www.w3.org/2001/XMLSchema-instance"
    xsi:noNamespaceSchemaLocation="QueryAbstraction.xsd">
    <Selection>
        <Condition relOperator="AND" field="data://patient/User">
```

-continued

```
            <Value val="John"/>
        </Condition>
    </Selection>
    <Results format="HTML" distinct="Yes" >
        <Union>
            <Field name="data://patient/User" fieldType="char"/>
            <Field name="data://patient/Patient" fieldType="char"/>
        </Union>
        <Union>
            <Field name="data://patient/Address" fieldType="char"/>
            <Field name="data://patient/Location" fieldType="char"/>
        </Union>
        <Field name="data://patient/Clinial Info" fieldType="char"/>
    </Results>
</QueryAbstraction>
```

Figure 4:
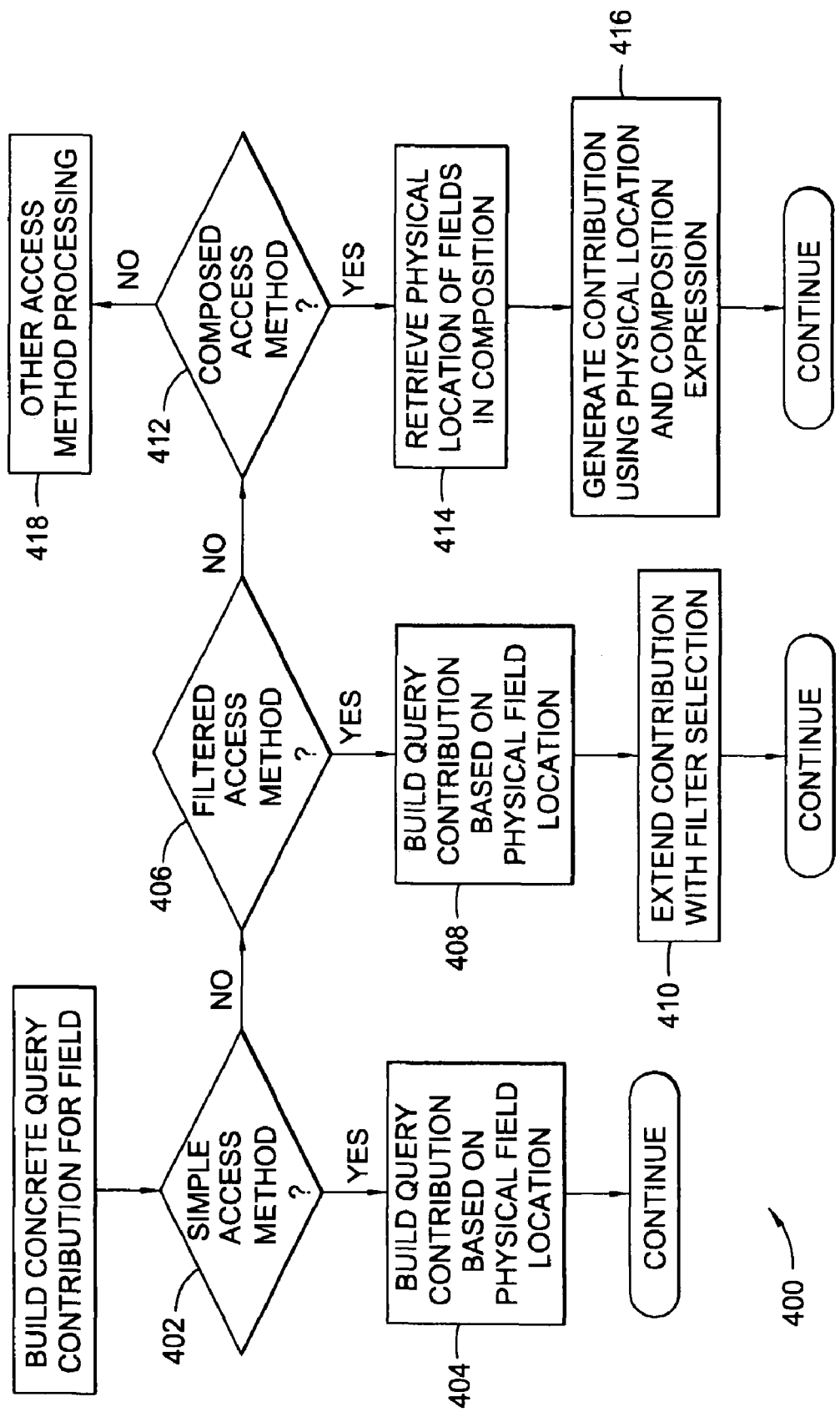
FIG. 4 is a flow chart illustrating the operation of a runtime component.
Figure 5:
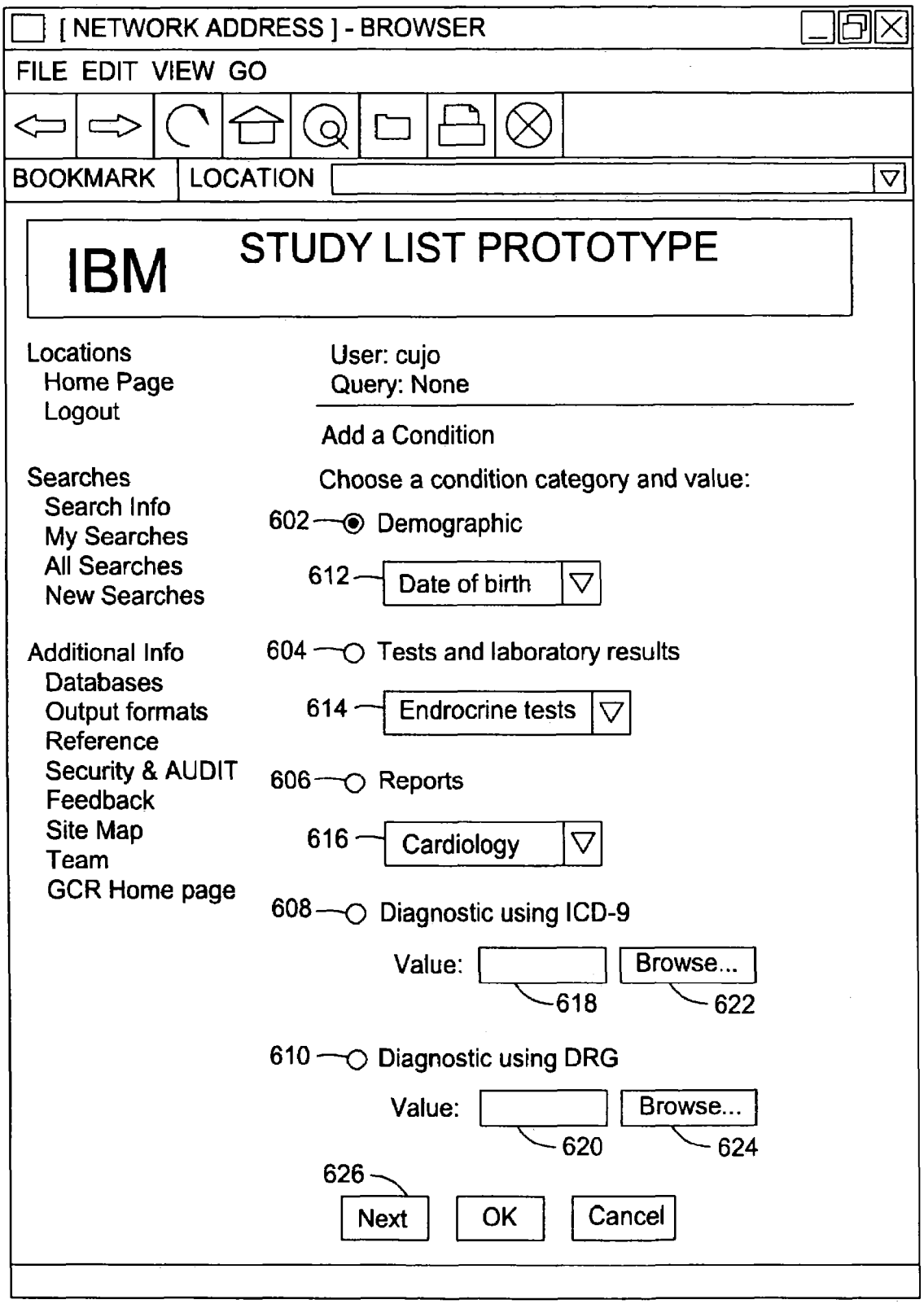
FIG. 5 is a graphical user interface screen for initiating the process of adding a condition to a query.
Figure 6:
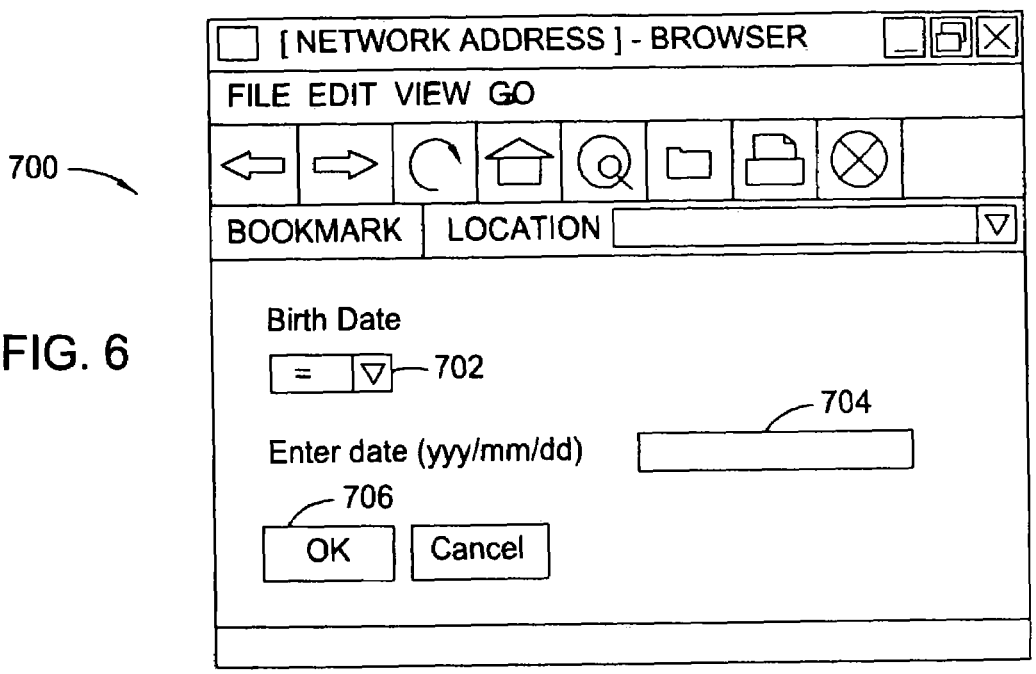
FIG. 6 is a graphical user interface screen for adding a birth date as a condition to a query.
Figure 11:
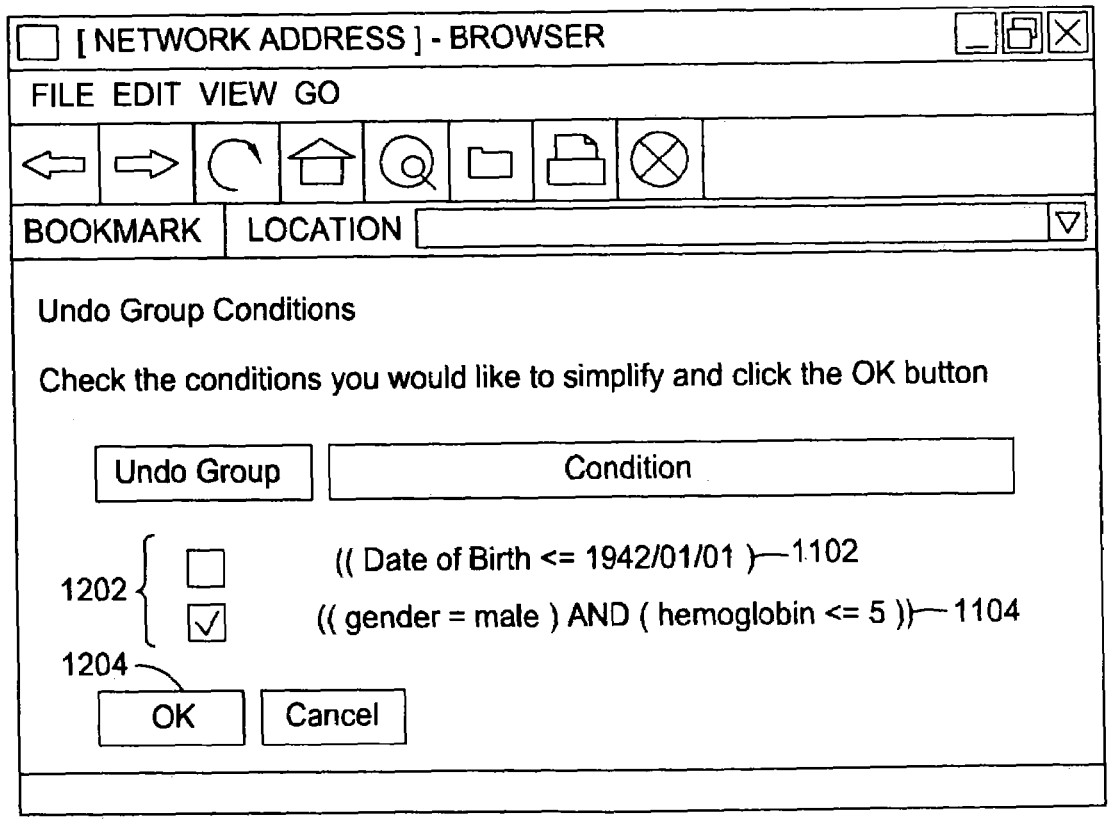
FIG. 11 is a graphical user interface screen from which a user may ungroup conditions of a complex condition.

The above abstract query may then the transformed into a concrete query in a manner substantially conforming to that described with respect to FIGS. 3–4. The runtime component 150 would implement the appropriate UNIONs and JOINs that are needed to return the data back to the end-user as expected. An SQL representation of the result field portion of the abstract query (i.e., that portion corresponding to the SELECT statement of the SQL statement) was provided above.

While the foregoing is directed to embodiments of the present invention, other and further embodiments of the invention may be devised without departing from the basic scope thereof, and the scope thereof is determined by the claims that follow.

What is claimed is:

1. A computer-implemented method for building queries, comprising:

providing a logical model to logically describe the physical fields, the logical model comprising logical fields corresponding to respective physical fields, wherein as least some of the logical fields are selectable as logical result fields in an abstract queries;

providing a graphical user interface allowing user selection and arrangement of logical result fields selected from the logical model;

receiving user input specifying a selection and a location, in the graphical user interface, of a first logical result field;

receiving user input specifying a selection and a location, in the graphical user interface, of a second logical result field, wherein the first and second logical result fields have a relative geometric relationship as displayed in the graphical user interface and define at least a portion of an abstract query; and transforming the abstract query into an executable query containing at least one combinatorial statement containing representations of the first and second logical result fields, the at least one combinatorial statement being generated as a result of the relative geometric relationship.

2. The method of claim 1, wherein the combinatorial statement is a UNION.

3. The method of claim 1, further comprising displaying each of the logical fields of the logical model as selectable logical result fields in the graphical user interface.

4. A computer readable storage medium containing a graphical user interface program which, when executed, performs an operation for building abstract queries defined with respect to a logical model comprising a plurality of definitions for logical fields mapping to physical fields of physical entities of the data, wherein as least some of the logical fields are selectable as logical result fields in the abstract queries, the operation comprising:

receiving user input specifying a selection and a location, in the graphical user interface, of a first logical result field; wherein the graphical user interface allows user selection of logical result fields from the logical model and supports combinatorial relations between user selected logical result fields;

receiving user input specifying a selection and a location, in the graphical user interface, of a second logical result field, wherein the first and second logical result fields define at least a portion of an abstract query and transforming the abstract query into an executable query containing at least one combinatorial statement containing counterparts of the first and second logical result fields.

5. The computer readable storage medium of claim 4, wherein the combinatorial statement is a UNION.

6. A computer readable storage medium containing a program which, when executed, performs an operation for building abstract queries defined with respect to a logical model comprising a plurality of definitions for logical fields mapping to physical fields of physical entities of the data, wherein as least some of the logical fields are selectable as logical result fields in the abstract queries, the operation comprising:

receiving user input specifying a selection and a location, in a graphical user interface, of a first logical result field; wherein the graphical user interface allows user selection and arrangement of logical result fields selected from the logical model;

receiving user input specifying a selection and a location, in the graphical user interface, of a second logical result field, wherein the first and second logical result fields have a relative geometric relationship as displayed in the graphical user interface and define at least a portion of an abstract query; and transforming the abstract query into an executable query containing at least one combinatorial statement containing counterparts of the first and second logical result fields, the at least one combinatorial statement being generated as a result of the relative geometric relationship.

7. The computer readable storage medium of claim 6, wherein the combinatorial statement is a UNION.

8. The computer readable storage medium of claim 6, wherein the relative geometric relationship is vertical.

9. A computer system, comprising:

at least one memory containing:

a logical model comprising a plurality of logical field definitions mapping to physical fields of physical entities of data, whereby the logical model defines a plurality of logical fields providing a logical view of the data, wherein each of the logical field definitions comprising a logical field name, at least one location attribute identifying a location of physical data corresponding to the logical field name and a reference to an access method selected from at least two different access method types; wherein each of the different access methods types defines a different manner of exposing the physical data corresponding to the logical field name of the respective logical field definition;

a query specification defining an interface to the plurality of logical field definitions thereby allowing abstract queries to be composed on the basis of the plurality of logical field definitions; and a graphical user interface allowing user selection and arrangement of logical fields selected from the logical model; wherein the graphical user interface comprises input cells for user-selected logical fields and wherein a predefined geometric relationship between cells specifies whether user-selected logical fields in the cells are related by a first combinatorial statement type or a second combinatorial statement type; and at least one processor configured to access the one or more memories.

10. The system of claim 9, wherein the first combinatorial statement type is a UNION and the second combinatorial statement type is a JOIN.

11. The system of claim 9, wherein the predefined geometric relationship is vertical.

12. The system of claim 9, wherein user-selected logical fields in horizontally adjacent cells are JOINed.

13. The system of claim 9, further comprising a relational database containing the physical entities of data.

* * * * *